US010865300B2

(12) United States Patent
Nad et al.

(10) Patent No.: US 10,865,300 B2
(45) Date of Patent: Dec. 15, 2020

(54) DILUTION THICKENING COMPOSITION

(71) Applicants: Dow Global Technologies LLC, Midland, MI (US); Rohm and Haas Company, Collegeville, PA (US)

(72) Inventors: Saugata Nad, Mumbai (IN); Ravi Rao, Pune (IN); Ashish G. Muratkar, Thane (IN); Robert Krasnansky, Le Rouret (FR)

(73) Assignees: Dow Global Technologies LLC, Midland, MI (US); Rohm and Haas Company, Philadelphia, PA (US)

(*) Notice: Subject to any disclaimer, the term of this patent is extended or adjusted under 35 U.S.C. 154(b) by 69 days.

(21) Appl. No.: 15/754,706

(22) PCT Filed: Aug. 22, 2016

(86) PCT No.: PCT/US2016/047960
§ 371 (c)(1),
(2) Date: Feb. 23, 2018

(87) PCT Pub. No.: WO2017/040080
PCT Pub. Date: Mar. 9, 2017

(65) Prior Publication Data
US 2018/0244910 A1    Aug. 30, 2018

(30) Foreign Application Priority Data
Sep. 2, 2015   (IN) ............. 2759/DEL/2015

(51) Int. Cl.
*C08L 33/10*   (2006.01)
*C08F 220/28*  (2006.01)
*C11D 3/22*    (2006.01)
*C11D 3/37*    (2006.01)
*C08L 33/14*   (2006.01)

(52) U.S. Cl.
CPC ............ *C08L 33/10* (2013.01); *C08F 220/28* (2013.01); *C11D 3/225* (2013.01); *C11D 3/3765* (2013.01); *C08L 33/14* (2013.01)

(58) Field of Classification Search
CPC ........ C08L 33/10; C08F 220/28; C11D 3/225; C11D 3/3765
See application file for complete search history.

(56) References Cited

U.S. PATENT DOCUMENTS

| 4,588,772 A | * | 5/1986 | Bohmer ............... C08G 81/02 523/457 |
| 6,812,195 B2 | | 11/2004 | Wierenga et al. |
| 6,919,303 B2 | | 7/2005 | Pham et al. |
| 8,524,649 B2 | | 9/2013 | Leyrer et al. |
| 2003/0119689 A1 | | 6/2003 | Hutton et al. |

FOREIGN PATENT DOCUMENTS

| EP | 934386 A1 | 8/1999 | |
| EP | 2853570 A1 * | 4/2015 | ......... C09D 133/064 |
| WO | WO-2008050209 A1 * | 5/2008 | ............. A61J 3/077 |

OTHER PUBLICATIONS

Petruta Dumitru et al: "The Influence of Rheology Modifiers and Dispersing Agents on the Quality of Water-based Decorative Paints", Rev. Chim, Jan. 1, 2010 (Jan. 1, 2010), XP055304984, (Year: 2010).*
Keary, C.M.; Characterization of Methocel Cellulose Ethers by Aqueous SEC With Multiple Detectors; Carbohydrate Polymers; vol. 45, Issue 3, PPGS 293-303; 2001.

* cited by examiner

*Primary Examiner* — Edward J Cain
(74) *Attorney, Agent, or Firm* — Kenneth Crimaldi

(57) ABSTRACT

An aqueous composition comprising: (1) an alkyl cellulose ether, and (2) an acrylic polymer comprising polymerized units of (i) 35 to 65 wt % $C_1$-$C_4$ alkyl acrylates; (ii) 30 to 60 wt % $C_3$-$C_6$ carboxylic acid monomers; and (iii) 2 to 10 wt % of monomers having an alkyl group having at least ten carbon atoms.

12 Claims, No Drawings

DILUTION THICKENING COMPOSITION

This invention relates to an aqueous composition which maintains high viscosity well upon dilution.

Alkali-soluble acrylic polymers and alkyl cellulose compounds are known as thickeners for aqueous compositions, as in, e.g., U.S. Pat. No. 6,919,303. However, this reference does not suggest the use of the composition described herein.

The problem solved by this invention is improved thickening of aqueous compositions which are diluted in use.

STATEMENT OF INVENTION

The present invention provides an aqueous composition comprising: (1) an alkyl cellulose ether, and (2) an acrylic polymer comprising polymerized units of (i) 35 to 65 wt % $C_1$-$C_4$ alkyl acrylates; (ii) 30 to 60 wt % $C_3$-$C_6$ carboxylic acid monomers; and (iii) 2 to 10 wt % of monomers having an alkyl group having at least ten carbon atoms.

DETAILED DESCRIPTION

Percentages are weight percentages (wt %) and temperatures are in ° C., unless specified otherwise. Operations were performed at room temperature (20-25° C.), unless specified otherwise. The detergent may be a powder, tablet, liquid, unit dose or gel. An "alkyl" group is a saturated, substituted or unsubstituted hydrocarbyl group having from one to twenty-two carbon atoms in a linear or branched arrangement. Alkyl groups are unsubstituted unless otherwise specified. As used herein the term "(meth)acrylic" refers to acrylic or methacrylic. A "$C_3$-$C_6$ carboxylic acid monomer" is a mono-ethylenically unsaturated compound having one or two carboxylic acid groups, e.g., (meth)acrylic acid, maleic acid, fumaric acid, itaconic acid, maleic anhydride, crotonic acid, etc.

An acrylic polymer is a polymer having at least 50 wt % polymerized residues of acrylic monomers, preferably at least 70 wt %, preferably at least 80 wt %, preferably at least 90 wt %, preferably at least 95 wt %, preferably at least 98 wt %. Acrylic monomers include (meth)acrylic acids and their $C_1$-$C_{22}$ alkyl or hydroxyalkyl esters, including monomers of structure $H_2C=C(R)CO_2(CH_2CH_2O)_n(CH(R')CH_2O)_mR''$; crotonic acid, itaconic acid, fumaric acid, maleic acid, maleic anhydride, (meth)acrylamides, (meth)acrylonitrile and alkyl or hydroxyalkyl esters of crotonic acid, itaconic acid, fumaric acid or maleic acid. The acrylic polymer may also comprise other polymerized monomer residues including, e.g., non-ionic (meth)acrylate esters, cationic monomers, $H_2C=C(R)C(O)X(CH_2CH_2O)_n(CH(R')CH_2O)_mR''$, monounsaturated dicarboxylates, vinyl esters, vinyl amides (including, e.g., N-vinylpyrrolidone), sulfonated acrylic monomers, vinyl sulfonic acid, vinyl halides, phosphorus-containing monomers, heterocyclic monomers, styrene and substituted styrenes. Preferably, the acrylic polymer has a weight average molecular weight ($M_w$) in the range from 10,000 to 220,000, preferably from 10,000 to 190,000, preferably from 15,000 to 160,000, preferably from 20,000 to 100,000, preferably from 20,000 to 60,000.

Preferably, the acrylic polymer comprises at least 38 wt % polymerized residues of $C_1$-$C_4$ alkyl acrylates, preferably at least 41 wt %, preferably at least 44 wt %, preferably at least 47 wt %. Preferably the polymer comprises no more than 62 wt % polymerized residues of $C_1$-$C_4$ alkyl acrylates, preferably no more than 59 wt %, preferably no more than 56 wt %, preferably no more than 53 wt %. Preferably, the $C_1$-$C_4$ alkyl acrylate residues are $C_2$-$C_3$ alkyl acrylate residues, preferably ethyl acrylate (EA). Preferably, the polymer contains no more than 10 wt % polymerized residues of (meth)acrylate esters that are not $C_1$-$C_4$ alkyl acrylates, preferably no more than 7 wt %, preferably no more than 4 wt %, preferably no more than 2 wt %.

Preferably, the polymer comprises at least 33 wt % polymerized residues of $C_3$-$C_6$ carboxylic acid monomers, preferably at least 36 wt %, preferably at least 39 wt %, preferably at least 42 wt %. Preferably, the polymer comprises no more than 57 wt % polymerized residues of $C_3$-$C_6$ carboxylic acid monomers, preferably no more than 54 wt %, preferably no more than 51 wt %, preferably no more than 48 wt %. Preferably, the $C_3$-$C_6$ carboxylic acid monomer is a $C_3$-$C_4$ carboxylic acid monomer; preferably (meth)acrylic acid, preferably methacrylic acid (MAA).

Preferably, the polymer contains no more than 8 wt % of polymerized residues of monomers having an alkyl group having at least ten carbon atoms, preferably no more than 6 wt %, preferably no more than 3 wt %. Preferably the polymer comprises polymerized residues of monomers having an alkyl group having at least twelve carbon atoms. Examples of such monomers are alkyl (meth)acrylates and monomers of structure $H_2C=C(R)C(O)X(CH_2CH_2O)_n(CH(R')CH_2O)_mR''$; wherein X is O or NH, R is H or $CH_3$, R' is $C_1$-$C_2$ alkyl; R'' is $C_{10}$-$C_{22}$ alkyl, $C_{10}$-$C_{16}$ alkylphenyl or $C_{13}$-$C_{36}$ aralkylphenyl; n is an average number from 6-100 and m is an average number from 0-50, provided that n≥m and m+n is 6-100. Preferred $C_{10}$-$C_{22}$ alkyl (meth)acrylates are the $C_{10}$-$C_{18}$ alkyl (meth)acrylates, preferably $C_{12}$-$C_{18}$ alkyl (meth)acrylates. Preferably, X is O; R'' is $C_{10}$-$C_{22}$ alkyl, n is 15-30 and m is 0-5; preferably n is 18-25 and m is 0-3; preferably, n is 18-25 and m is 0; and R' and R are methyl. Preferably, the polymer contains no more than 10 wt % of polymerized residues of monomers that are not acrylic monomers, preferably no more than 7 wt %, preferably no more than 5 wt %, preferably no more than 2 wt %.

In the alkyl cellulose ethers, preferably the alkyl ether groups are $C_1$-$C_4$ alkyl; preferably $C_1$-$C_3$ alkyl; preferably methyl; in hydroxyalkyl cellulose ethers, preferably the hydroxyalkyl groups are 2-hydroxyethyl or 2-hydroxypropyl. More than one type of alkyl or hydroxyalkyl group may be present on a cellulose ether. Especially preferred cellulose ethers include, e.g., hydroxyethyl methyl cellulose (HEMC) and hydroxypropyl methyl cellulose (HPMC). The number of alkyl ether or hydroxyalkyl groups per glucopyranosyl unit is determined by analysis of the polymer. For example, for METHOCEL HPMC polymers the determination of the % methoxyl and % hydroxypropoxyl in hydroxypropyl methylcellulose is carried out according to the United States Pharmacopeia (USP 32). The values obtained are % methoxyl and % hydroxypropoxyl as weight percentages. These are subsequently converted into degree of substitution (DS) for methyl substituents and molar substitution (MS) for hydroxypropyl substituents. Residual amounts of salt and moisture have been taken into account in the conversion.

The preferred wt % methoxyl varies from 10% and 35%, preferably from 20% to 35%, preferably from 25 to 33%; and the preferred wt % hydroxypropoxyl varies from 2% to 15%, preferably from 4% to 12%. For CELLOSIZE HEC polymers, the determination of the ethylene oxide molar substitution (EO MS) can be conducted using the Zeisel method as described in ASTM D-4794. The preferred EO MS varies between 0.5 and 5.0, preferably 1.5 to 3.5.

Preferably, an alkyl cellulose ether or a hydroxyalkyl cellulose ether has an average degree of substitution of 1.0 to 2.5 $C_1$-$C_6$ alkyl ether groups per glucopyranosyl unit; preferably it has a viscosity, measured from a 1 wt % solution in water at 20° C., of 10 to 100,000 mPa·s, preferably 50 to 7,000, preferably 100 to 6,000. Aqueous solution viscosities were measured for these cellulose ethers using either a Brookfield LVT viscometer at 25° C. and 30 rpm or according to United States Pharmacopeia (USP 35, "Hypromellose", pages 3467-3469) followed by an Ubbelohde viscosity measurement according to DIN 51562-1: 1999-01 (January 1999). Viscosities of cellulose ethers have been correlated with molecular weights, and accordingly, one skilled in the art would understand the meaning of either measurement. See C. M. Keary, *Carbohydrate Polymers*, vol. 45 (2001), pages 293-303. Cellulose polymers contain repeat units having a 1,4'-β-glucopyranosyl structure, also known as anhydroglucose.

Preferably, the alkyl or hydroxyalkyl cellulose ether is of formula (I)

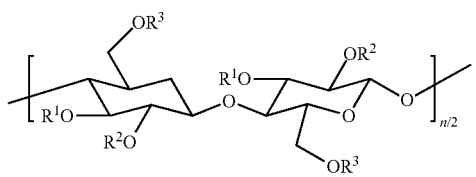

I wherein $R^1$, $R^2$ and $R^3$ are independently selected from: hydrogen, alkyl or hydroxyalkyl; wherein alkyl groups may comprise from one to six carbon atoms which may be unsubstituted or substituted with carboxylic acid or salts thereof (attached to alkyl via carbon, e.g., carboxymethyl cellulose), halo or $C_1$-$C_4$ alkoxy; and n (also known as the "degree of polymerization") is from 25 to 7,500.

Preferably, the aqueous composition comprises at least 0.1 wt % of the alkyl cellulose ether, preferably at least 0.15 wt %, preferably at least 0.2 wt %, preferably at least 0.25 wt %, preferably at least 0.3 wt %; preferably no more than 1 wt %, preferably no more than 0.8 wt %, preferably no more than 0.7 wt %, preferably no more than 0.6 wt %, preferably no more than 0.5 wt %. Preferably, the aqueous composition comprises at least 0.3 wt % of the acrylic polymer, preferably at least 0.5 wt %, preferably at least 0.7 wt %, preferably at least 0.9 wt %, preferably at least 1.1 wt %, preferably at least 1.3 wt %, preferably at least 1.5 wt %, preferably at least 1.7 wt %; preferably no more than 4 wt %, preferably no more than 3.5 wt %, preferably no more than 3 wt %, preferably no more than 2.7 wt %, preferably no more than 2.5 wt %.

Preferably, the aqueous composition is used in a cleaning composition, preferably for home and personal care use, e.g., a liquid laundry detergent, a hard surface cleaner, a liquid hand soap or a liquid dishwashing detergent. Preferably, the aqueous composition comprises at least 8 wt % surfactants, preferably at least 10 wt %, preferably at least 12 wt %, preferably at least 15 wt %, preferably at least 20 wt %, preferably at least 30 wt %, preferably at least 40 wt %, preferably at least 50 wt %. Preferably, the aqueous composition comprises no more than 80 wt % surfactants, preferably no more than 70 wt %, preferably no more than 60 wt %, preferably no more than 50 wt %, preferably no more than 40 wt %, preferably no more than 30 wt %, and preferably no more than 20 wt %.

Preferably, the aqueous composition comprises at least 40 wt % water, preferably at least 45 wt %, preferably at least 50 wt %, preferably at least 55 wt %, preferably at least 60 wt %, preferably at least 65 wt %, preferably at least 70 wt %; preferably no more than 85 wt %, preferably no more than 82 wt %, preferably no more than 79 wt %, preferably no more than 76 wt %, preferably no more than 73 wt %, preferably no more than 70 wt %.

The aqueous composition may also comprise hydrotropes (e.g., ethanol, propylene glycol), enzymes (e.g., protease, lipase, amylase), preservatives, perfumes, fluorescent whitening agents, dyes and additive polymers (e.g., anti-redeposition polymers, anti-graying polymers). In one preferred embodiment of the invention, the aqueous composition comprises from 2 to 20 wt % propylene glycol; preferably at least 5 wt %, preferably at least 8 wt %; preferably no more than 18 wt %, preferably no more than 16 wt %. In addition, the composition may contain other co-solvents (e.g., ethanol), amines (e.g., monoethanolamine, triethanolamine, MiPA, DiPA, TiPA, AMP-95) and organic sulfonates (sodium toluene, cumene and xylene). Preferably, the aqueous composition comprises from 0.5 to 8 wt % of these other co-solvents; preferably at least 1 wt %, preferably at least 2 wt %; preferably no more than 6 wt %, preferably no more than 4 wt %.

The surfactant(s) may be cationic, anionic, nonionic, fatty acid metal salt, zwitterionic or betaine surfactants. Preferably, the surfactant comprises at least one surfactant selected from anionic and nonionic surfactants, preferably at least two. Preferably, nonionic surfactants have an alkyl group having at least eight carbon atoms and at least five polymerized ethylene oxide or propylene oxide residues. Preferably, nonionic surfactants have at least five polymerized ethylene oxide residues, preferably at least six, preferably at least seven, preferably at least eight; preferably no more than twelve, preferably no more than eleven, preferably no more than ten.

Preferably, the aqueous composition has a pH from 6 to 12.5; preferably at least 6.5, preferably at least 7, preferably at least 7.5; preferably no greater than 12.25, preferably no greater than 12, preferably no greater than 11.5. Suitable bases to adjust the pH include mineral bases such as sodium hydroxide (including soda ash) and potassium hydroxide; sodium bicarbonate, sodium silicate, ammonium hydroxide; and organic bases such as mono-, di- or tri-ethanolamine; or 2-dimethylamino-2-methyl-1-propanol (DMAMP). Mixtures of bases may be used. Suitable acids to adjust the pH of the aqueous medium include mineral acid such as hydrochloric acid, phosphorus acid, and sulfuric acid; and organic acids such as acetic acid. Mixtures of acids may be used. The formulation may be adjusted to a higher pH with base and then back titrated to the ranges described above with acid.

EXAMPLES

Example 1

| Ingredients | Composition of the Invention % by wt | Dish wash liquid containing polyacrylic acid[1] % by wt |
|---|---|---|
| ACID SLURRY (96%) | 8.05 | 8 |
| CITRIC ACID Monohydrate | 0 | 0 |
| NaCl-solid | 0 | 0 |
| SLES Paste (70%) | 11.8 | 12 |
| Thickener B | 0.35 | 0 |
| ACUSOL 445 | 0 | 1 |
| Thickener A | 2 | 0 |
| 50% NaOH Solution | 2.5 | 2.5 |
| CAPB (30%) | 3.5 | 3.5 |
| Magnesium Sulfate | 4 | 4 |
| Color-Liquitint pink AL | 0.0025 | 0.0025 |
| PERFUME-Orange Inde | 0.3 | 0.3 |
| DMDMH | 0.1 | 0.1 |
| EDTA-solid | 0 | 0 |
| NaOH Flakes (98%) | 0 | 0 |
| Water (R.O./D.I.) | 67.40 | 67.38 |
| TOTAL INPUT | 100 | 100 |
| pH | 5.5 | 5.5 |

[1] ACUSOL 445, composition of U.S. Pat. No. 8,524,649

Thickener A is a polymer made from 50 EA/45 MAA/3.75 SM1/1.25 SM2, where SM1 and SM2 are methacrylates with 20 and 23 moles EO and $C_{16-18}$ and $C_{12}$ alkyl groups, respectively; Thickener B is a hydroxypropyl methylcellulose having 27-32 mole % methoxy, 5-10 mole % hydroxypropyl and viscosity of 4,000 mPa·s

| Dilution (product:water) | Composition of the Invention Viscosity (cps) | Dish wash liquid containing ACUSOL 445 Viscosity (cps) |
|---|---|---|
| 2:1 | 5000 | 700 |
| 1:1 | 4200 | 270 |
| 1:2 | 1200 | Cannot detect |

Example 2

| Ingredients | Composition of the Invention % by wt | Dish wash liquid containing Thickener A % by wt | Dish wash liquid containing Rheoderm LIS 75[2] % by wt | Dish wash liquid containing Thickener B and Rheoderm LIS 75 % by wt |
|---|---|---|---|---|
| ACID SLURRY (96%) | 8.05 | 8 | 8 | 8 |
| CITRIC ACID Monohydrate | 0 | 0 | 0 | 0 |
| NaCl-solid | 0 | 0 | 0 | 0 |
| SLES Paste (70%) | 11.8 | 12 | 12 | 12 |
| Thickener B | 0.35 | 0 | 0 | 0.35 |
| Thickener A | 2 | 2 | 0 | 0 |
| RHEODERM LIS 75 | 0 | 0 | 2 | 2 |
| 50% NaOH Solution | 2.5 | 2.5 | 2.5 | 2.5 |
| CAPB (30%) | 3.5 | 3.5 | 3.5 | 3.5 |
| Magnesium Sulfate | 4 | 4 | 4 | 4 |
| Color-Liquitint pink AL | 0.0025 | 0.0025 | 0.0025 | 0.0025 |
| PERFUME-Orange Inde | 0.3 | 0.3 | 0.3 | 0.3 |
| DMDMH | 0.1 | 0.1 | 0.1 | 0.1 |
| EDTA-solid | 0 | 0 | 0 | 0 |
| NaOH Flakes (98%) | 0 | 0 | 0 | 0 |
| Water (R.O./D.I.) | 67.40 | 67.40 | 67.38 | 67.38 |
| TOTAL INPUT | 100 | 100 | 100 | 100 |
| pH | 5.5 | 5.5 | 5.5 | 5.5 |

[2] Composition of EP1656105.

| Dilution (Product:Water) | Composition of the Invention Viscosity (cps) | Dish wash Liquid containing Thickener A Viscosity (cps) | Dish wash Liquid containing Rheoderm LIS 75 Viscosity (cps) | Dish wash Liquid containing Thickener B and Rheoderm LIS 75 Viscosity (cps) |
|---|---|---|---|---|
| 2:1 | 5000 | 530 | 315 | 430 |
| 1:1 | 4200 | 300 | 125 | 320 |
| 1:2 | 1200 | Cannot detect | Cannot detect | Cannot detect |

Example 3

| Ingredients | Composition of the Invention % by wt | Dish wash Liquid[3] containing Thickener A % by wt | Dish wash Liquid containing salt and Thickener A % by wt |
|---|---|---|---|
| ACID SLURRY (96%) | 8.05 | 8 | 8.05 |
| CITRIC ACID Monohydrate | 0 | 0 | 0 |
| NaCl-solid | 0 | 0 | 0.5 |
| SLES Paste (70%) | 11.8 | 12 | 11.8 |
| Thickener B | 0.35 | 0 | 0 |
| Thickener A | 2 | 2 | 2 |
| 50% NaOH Solution | 2.5 | 2.5 | 2.5 |
| CAPB (30%) | 3.5 | 3.5 | 3.5 |
| Magnesium Sulfate | 4 | 4 | 4 |
| Color-Liquitint pink AL | 0.0025 | 0.0025 | 0.0025 |
| PERFUME-Orange Inde | 0.3 | 0.3 | 0.3 |
| DMDMH | 0.1 | 0.1 | 0.1 |
| EDTA-solid | 0 | 0 | 0 |
| NaOH Flakes (98%) | 0 | 0 | 0 |
| Water (R.O./D.I.) | 67.40 | 67.40 | 67.40 |

[3]Composition of U.S. Pat. No. 6,812,195

| Dilution (Product:Water) | Composition of the Invention Viscosity (cps) | Dish wash Liquid containing Thickener A Viscosity (cps) | Dish wash Liquid containing salt and Thickener A Viscosity (cps) |
|---|---|---|---|
| 2:1 | 5000 | 530 | 315 |
| 1:1 | 4200 | 300 | 234 |
| 1:2 | 1200 | Cannot detect | Cannot detect |

Example 4

| Ingredients | Composition of the Invention % by wt | Dish wash Liquid[4] containing Smectite Clay and Thickener A % by wt |
|---|---|---|
| ACID SLURRY (96%) | 8.05 | 8 |
| CITRIC ACID Monohydrate | 0 | 0 |
| NaCl-solid | 0 | 0.5 |
| SLES Paste (70%) | 11.8 | 12 |
| Thickener B | 0.35 | 0 |
| Smectite clay | 0 | 2 |
| Thickener A | 2 | 2 |
| 50% NaOH Solution | 2.5 | 2.5 |
| CAPB (30%) | 3.5 | 3.5 |
| Magnesium Sulfate | 4 | 4 |
| Color-Liquitint pink AL | 0.0025 | 0.0025 |
| PERFUME-Orange Inde | 0.3 | 0.3 |
| DMDMH | 0.1 | 0.1 |
| EDTA-solid | 0 | 0 |
| NaOH Flakes (98%) | 0 | 0 |
| Water (R.O./D.I.) | 67.40 | 67.38 |
| TOTAL INPUT | 100 | 100 |
| pH | 5.5 | 5.5 |

| Dilution (Product:Water) | Composition of the Invention Viscosity (cps) | Dish wash Liquid containing Smectite Clay and Thickener A Viscosity (cps) |
|---|---|---|
| 2:1 | 5000 | 490 |
| 1:1 | 4200 | 270 |
| 1:2 | 1200 | Cannot detect |

[4]Composition of US20030119689

Example 5

| Ingredients | Composition of the Invention % by wt | Dish wash liquid containing Thickener A and NEODOL | Dish wash Liquid[5] containing Salt + Thickener A + NEODOL % by wt |
|---|---|---|---|
| ACID SLURRY (96%) | 8.05 | 8 | 8 |
| CITRIC ACID Monohydrate | 0 | 0 | 0 |
| NaCl-solid | 0 | 0 | 0.5 |
| SLES Paste (70%) | 11.8 | 12 | 12 |
| Thickener B | 0.35 | 0 | 0 |
| Thickener A | 2 | 2 | 2 |
| NEODOL | 0 | 1 | 1 |
| 50% NaOH Solution | 2.5 | 2.5 | 2.5 |
| CAPB (30%) | 3.5 | 3.5 | 3.5 |
| Magnesium Sulfate | 4 | 4 | 4 |
| Color-Liquitint pink AL | 0.0025 | 0.0025 | 0.0025 |
| PERFUME-Orange Inde | 0.3 | 0.3 | 0.3 |
| DMDMH | 0.1 | 0.1 | 0.1 |
| EDTA-solid | 0 | 0 | 0 |
| NaOH Flakes (98%) | 0 | 0 | 0 |
| Water (R.O./D.I.) | 67.40 | 67.38 | 67.38 |
| TOTAL INPUT | 100 | 100 | 100 |
| pH | 5.5 | 5.5 | 5.5 |

[5]Composition of EP934386

| Dilution (Product:Water) | Composition of the Invention Viscosity (cps) | Dish wash liquid containing Thickener A and NEODOL Viscosity (cps) | Dish wash Liquid containing Salt + Thickener A + NEODOL |
|---|---|---|---|
| 2:1 | 5000 | 535 | 400 |
| 1:1 | 4200 | 312 | 220 |
| 1:2 | 1200 | Cannot detect | Cannot detect |

The invention claimed is:

1. An aqueous cleaning composition comprising: at least 8 wt% surfactants; an alkyl cellulose ether, wherein the alkyl cellulose ether is a hydroxyalkyl methylcellulose in which the hydroxyalkyl groups are 2-hydroxyethyl or 2-hydroxypropyl; an acrylic polymer comprising polymerized units of (i) 38 to 62 wt% $C_1$-$C_4$ alkyl acrylates; (ii) 33 to 57 wt% $C_3$-$C_6$ carboxylic acid monomers; and (iii) 3 to 8 wt% of monomers having an alkyl group having at least ten carbon atoms having formula

$$H_2C=C(R)C(O)X(CH_2CH_2O)_n(CH(R')CH_2O)_mR''$$

wherein X is O or NH, R is H or $CH_3$, R' is $C_1$-$C_2$ alkyl; R'' is $C_{10}$-$C_{22}$ alkyl, $C_{10}$-$C_{16}$ alkylphenyl or $C_{13}$-$C_{36}$ aralkylphenyl; n is an average number from 6-100 and m is an average number from 0-50, provided that n≥m and m+n is 6 to 100.

2. The aqueous composition of claim 1 having from 0.1 to 1 wt% of the hydroxyalkyl methylcellulose and from 0.3 to 4 wt% of the acrylic polymer.

3. The aqueous composition of claim 2 in which in which the hydroxyalkyl methylcellulose is a hydroxypropyl methylcellulose having a viscosity, measured from a 1 wt% solution in water at 20° C., of 50 to 7,000 mPa·s.

4. The aqueous composition of claim 3 in which X is O, R'' is $C_{10}$-$C_{22}$ alkyl; n is an average number from 18-25 and m is 0.

5. The aqueous composition of claim 4 in which the acrylic polymer comprises polymerized units of 41 to 59 wt% $C_1$-$C_4$ alkyl acrylates and 36 to 54 wt% $C_3$-$C_6$ carboxylic acid monomer.

6. The aqueous composition of claim 5 in which the acrylic polymer has weight-average molecular weight from 15,000 to 160,000.

7. An aqueous cleaning composition comprising:
50 to 85 wt% water;
at least 8 wt% surfactant;
0.1 to 1 wt% of an alkyl cellulose ether, wherein the alkyl cellulose ether is a hydroxyalkyl methylcellulose in which the hydroxyalkyl groups are 2-hydroxyethyl or 2-hydroxypropyl;
6 to 4 wt% of an acrylic polymer comprising polymerized units of (i) 38 to 62 wt% $C_1$-$C_4$ alkyl acrylates; (ii) 33 to 57 wt% $C_3$-$C_6$ carboxylic acid monomers; and (iii) 3 to 8 wt% of monomers having an alkyl group having at least ten carbon atoms having formula

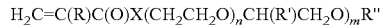

wherein X is O or NH, R is H or $CH_3$, R' is $C_1$-$C_2$ alkyl; R" is $C_{10}$-$C_{22}$ alkyl, $C_{10}$-$C_{16}$ alkylphenyl or $C_{13}$-$C_{36}$ aralkylphenyl; n is an average number from 6-100 and m is an average number from 0-50, provided that n≥m and m+n is 6 to 100; wherein the aqueous cleaning composition is diluted in use.

8. The aqueous cleaning composition of claim 7, wherein the surfactant is a mixture of an anionic surfactant and a nonionic surfactant, wherein the nonionic surfactant has an alkyl group having at least eight carbon atoms and at least five polymerized ethylene oxide or propylene oxide residues.

9. The aqueous composition of claim 8, wherein the hydroxyalkyl methylcellulose is a hydroxypropyl methylcellulose having a viscosity, measured from a 1 wt% solution in water at 20° C., of 50 to 7,000 mPa·s.

10. The aqueous composition of claim 9, wherein X is 0, R" is $C_{10}$-$C_{22}$ alkyl; n is an average number from 18-25 and m is 0.

11. The aqueous composition of claim 10, wherein the acrylic polymer comprises polymerized units of 41 to 59 wt% $C_1$-$C_4$ alkyl acrylates and 36 to 54 wt% $C_3$-$C_6$ carboxylic acid monomer.

12. The aqueous composition of claim 11, wherein the acrylic polymer has weight-average molecular weight from 15,000 to 160,000.

* * * * *